US012567681B2

(12) United States Patent
Dunsmore et al.

(10) Patent No.: US 12,567,681 B2
(45) Date of Patent: Mar. 3, 2026

(54) ANTENNA ARRAY MEASUREMENT AND CALIBRATION

(71) Applicant: Keysight Technologies, Inc., Santa Rosa, CA (US)

(72) Inventors: Joel P. Dunsmore, Sebastopol, CA (US); Tuan Tang, Santa Clara, CA (US)

(73) Assignee: KEYSIGHT TECHNOLOGIES, INC., Santa Rosa, CA (US)

( * ) Notice: Subject to any disclaimer, the term of this patent is extended or adjusted under 35 U.S.C. 154(b) by 530 days.

(21) Appl. No.: 18/084,231

(22) Filed: Dec. 19, 2022

(65) Prior Publication Data

US 2024/0204420 A1 Jun. 20, 2024

Related U.S. Application Data

(62) Division of application No. 18/084,117, filed on Dec. 19, 2022.

(51) Int. Cl.

| | |
|---|---|
| *H01Q 21/24* | (2006.01) |
| *H01Q 3/26* | (2006.01) |
| *H01Q 3/28* | (2006.01) |
| *H01Q 3/38* | (2006.01) |
| *H04B 17/12* | (2015.01) |

(52) U.S. Cl.
CPC ............. *H01Q 21/24* (2013.01); *H01Q 3/267* (2013.01); *H01Q 3/28* (2013.01); *H01Q 3/38* (2013.01); *H04B 17/12* (2015.01)

(58) Field of Classification Search
CPC .......... H01Q 21/24; H01Q 3/267; H01Q 3/28; H01Q 3/38; H04B 17/12; G01S 7/40
See application file for complete search history.

(56) References Cited

U.S. PATENT DOCUMENTS

| | | | |
|---|---|---|---|
| 10,211,527 B2 | 2/2019 | Safavi-Naeini et al. | |
| 11,424,539 B2 * | 8/2022 | Alpman | H01L 23/552 |
| 2018/0062260 A1 | 3/2018 | Khalil et al. | |
| 2023/0412285 A1 * | 12/2023 | West | H01Q 3/267 |

FOREIGN PATENT DOCUMENTS

| | | | |
|---|---|---|---|
| CN | 112505434 A | 3/2021 | |
| JP | H0712870 A | * 1/1995 | |

OTHER PUBLICATIONS

Ruoxin Li et al., "An Accurate Mid-Field Calibration Technique for Large Phased Array Antenna," 2017 Sixth Asia-Pacific Conference on Antennas and Propagation (APCAP), 2017, pp. 1-3.
Notice of Allowance dated May 29, 2025, U.S. Appl. No. 18/084,117, 14 pgs.
English translation of CN112505434, 11 pgs.
Corrected Notice of Allowability dated Sep. 23, 2025 for U.S. Appl. No. 18/084,117, 9 pgs.

* cited by examiner

*Primary Examiner* — Vladimir Magloire
*Assistant Examiner* — Eric K Hodac

(57) ABSTRACT

A system for measuring and calibrating an antenna array having a plurality of antenna array elements each configured to individually radiate signals is described. The system includes an antenna array controller comprising a memory that stores instructions and a processor that executes the instructions. When executed by the processor, the instructions cause the system to: measure a magnitude and phase of each of a set of antenna array elements; and compensate for leakage of other antenna array elements of the set of antenna array elements.

20 Claims, 11 Drawing Sheets

200

20

Figure 3:
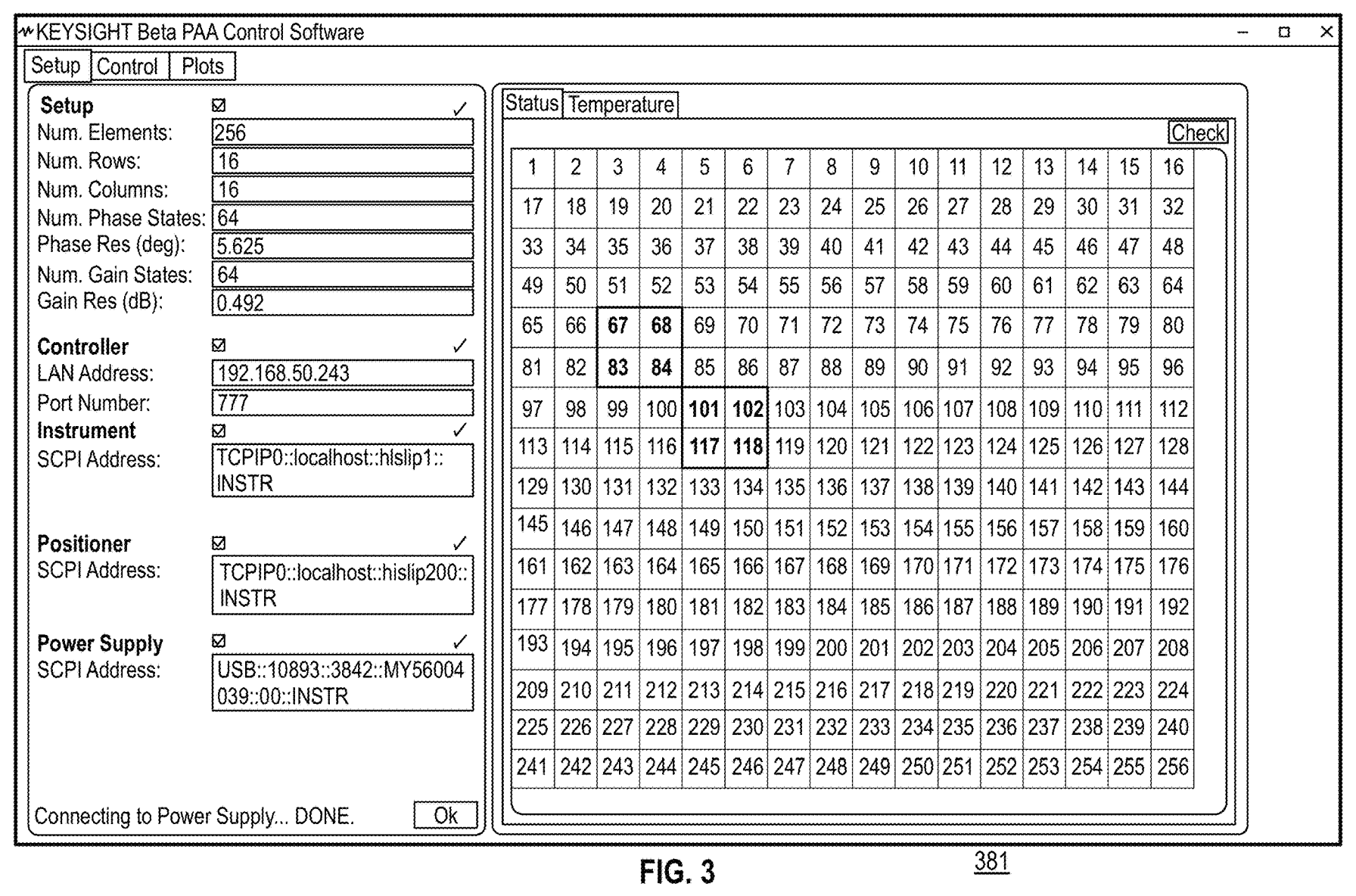

KEYSIGHT Beta PAA Control Software

Setup | Control | Plots

Setup
Num. Elements: 256
Num. Rows: 16
Num. Columns: 16
Num. Phase States: 64
Phase Res (deg): 5.625
Num. Gain States: 64
Gain Res (dB): 0.492

Controller
LAN Address: 192.168.50.243
Port Number: 777
Instrument
SCPI Address: TCPIP0::localhost::hislip1::INSTR

Positioner
SCPI Address: TCPIP0::localhost::hislip200::INSTR

Power Supply
SCPI Address: USB::10893::3842::MY56004039::00::INSTR

Connecting to Power Supply... DONE.
Ok

Status | Temperature

Check

| 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|
| 1 | 2 | 3 | 4 | 5 | 6 | 7 | 8 | 9 | 10 | 11 | 12 | 13 | 14 | 15 | 16 |
| 17 | 18 | 19 | 20 | 21 | 22 | 23 | 24 | 25 | 26 | 27 | 28 | 29 | 30 | 31 | 32 |
| 33 | 34 | 35 | 36 | 37 | 38 | 39 | 40 | 41 | 42 | 43 | 44 | 45 | 46 | 47 | 48 |
| 49 | 50 | 51 | 52 | 53 | 54 | 55 | 56 | 57 | 58 | 59 | 60 | 61 | 62 | 63 | 64 |
| 65 | 66 | 67 | 68 | 69 | 70 | 71 | 72 | 73 | 74 | 75 | 76 | 77 | 78 | 79 | 80 |
| 81 | 82 | 83 | 84 | 85 | 86 | 87 | 88 | 89 | 90 | 91 | 92 | 93 | 94 | 95 | 96 |
| 97 | 98 | 99 | 100 | 101 | 102 | 103 | 104 | 105 | 106 | 107 | 108 | 109 | 110 | 111 | 112 |
| 113 | 114 | 115 | 116 | 117 | 118 | 119 | 120 | 121 | 122 | 123 | 124 | 125 | 126 | 127 | 128 |
| 129 | 130 | 131 | 132 | 133 | 134 | 135 | 136 | 137 | 138 | 139 | 140 | 141 | 142 | 143 | 144 |
| 145 | 146 | 147 | 148 | 149 | 150 | 151 | 152 | 153 | 154 | 155 | 156 | 157 | 158 | 159 | 160 |
| 161 | 162 | 163 | 164 | 165 | 166 | 167 | 168 | 169 | 170 | 171 | 172 | 173 | 174 | 175 | 176 |
| 177 | 178 | 179 | 180 | 181 | 182 | 183 | 184 | 185 | 186 | 187 | 188 | 189 | 190 | 191 | 192 |
| 193 | 194 | 195 | 196 | 197 | 198 | 199 | 200 | 201 | 202 | 203 | 204 | 205 | 206 | 207 | 208 |
| 209 | 210 | 211 | 212 | 213 | 214 | 215 | 216 | 217 | 218 | 219 | 220 | 221 | 222 | 223 | 224 |
| 225 | 226 | 227 | 228 | 229 | 230 | 231 | 232 | 233 | 234 | 235 | 236 | 237 | 238 | 239 | 240 |
| 241 | 242 | 243 | 244 | 245 | 246 | 247 | 248 | 249 | 250 | 251 | 252 | 253 | 254 | 255 | 256 |

Data Acquisition

Leakage Deembedding

1

ANTENNA ARRAY MEASUREMENT AND CALIBRATION

CROSS-REFERENCE TO RELATED APPLICATIONS

The present application is related to commonly-owned and concurrently filed U.S. Pat. No. 18/084,117) entitled "Antenna Array Measurement and Calibration," naming Joel Dunsmore and Tuan Tang as inventors. The entire disclosure of U.S. Pat. No. 18/084,117) is specifically incorporated herein by reference.

BACKGROUND

Phased-array antennas comprise many individual radiating antenna array elements, each one of which can be controlled in phase independently, and typically amplitude as well. Phased-array antennas create beams which can be electronically steered in various directions. Due to differences in processing methods, layout and other defects, the effective radiating amplitude and phase of each antenna array element may be different and so a calibration step is necessary to remove these amplitude and phase differences. For transmit antennas, a common method is to point the beam on bore-sight (nominally 0 degrees phase) to align a barrel with the target and phase adjust each antenna array element for maximum signal. An antenna will have typically 64, 128 or 256 phase states, and as the arrays grow larger the number of antenna array elements may exceed 1024. To calibrate such an array, say 256 states at 1024 antenna array elements, a total of 262, 124 measurements are needed. Using typical methods, each measurement can take 10-20 milli-seconds, yielding a total test time on the order of an hour per unit. Where control is not fully automated, it is not unusual for a measurement to take more than a day. The typical measurement device is a power-meter or spectrum amplifier measuring the total received power. For each array phase sweep, the phase which maximizes the power is recorded. At the end of a phase sweep on every antenna array element, the phase for each antenna array element which maximized the power is recorded as the array offset value.

Currently, the phase of each antenna array element may be measured one time using a vector network analyzer (VNA) with a phase referenced to a reference receiver. The array attenuation is set to minimum except for the antenna array element being measured which is set to a maximum. The element-by-element phase offset to some reference antenna array element is determined in this way. The vector network analyzer measures the phase of each antenna array element directly. Then an offset data set is computed as an array calibration and the phase of each antenna array element is offset by this amount. Finally the array is remeasured to determine any residual offset. If needed, the array calibration factors are updated with the residual error offset.

The current solution still requires a great number of measurements, and these measurements are typically coordinated by an external computer with a cycle time in the tens to hundreds of milliseconds. Often the arrays do not have a large enough range of attenuator to shut off all the antenna array elements but the one under test, such that the total radiated power of the N−1 antenna array elements is nearly as great or even greater than the signal from the one antenna array element being measured. This compromises measurement of the phase of the target antenna array element and can be described as a problem of leakage. That is, the leakage from the array compromises the array measurement. The leakage of the antenna array elements can be expressed in decibels as Leakage=20*log 10(N)−A, where A is the attenuation range of the antenna array elements (typically 32 decibels, for example) and N is the number of antenna array elements. Thus, for a antenna array with 256 antenna array elements, the leakage would be +18 decibels above the maximum signal of a single antenna array element. In essence the response of a single antenna array element would be hidden below the leakage of the array.

SUMMARY

According to an aspect of the present disclosure, a system is provided for measuring and calibrating an antenna array comprising a plurality of antenna array elements each configured to individually radiate signals. The system includes an antenna array controller comprising a memory that stores instructions and a processor that executes the instructions. When executed by the processor, the instructions cause the system to: measure a magnitude and phase of each of a set of antenna array elements; and compensate for leakage of other antenna array elements of the set of antenna array elements.

According to another aspect of the present disclosure, a tangible, non-transitory computer readable medium comprising instructions, which when executed by a processor, cause the processor to: measure a magnitude and phase of each of a set of antenna array elements; and compensate for leakage of other antenna array elements of the set of antenna array elements.

BRIEF DESCRIPTION OF THE DRAWINGS

The example embodiments are best understood from the following detailed description when read with the accompanying drawing figures. It is emphasized that the various features are not necessarily drawn to scale. In fact, the dimensions may be arbitrarily increased or decreased for clarity of discussion. Wherever applicable and practical, like reference numerals refer to like elements.

FIG. 3 illustrates a user interface for antenna array measurement and calibration, in accordance with a representative embodiment.

DETAILED DESCRIPTION

Figure 1:
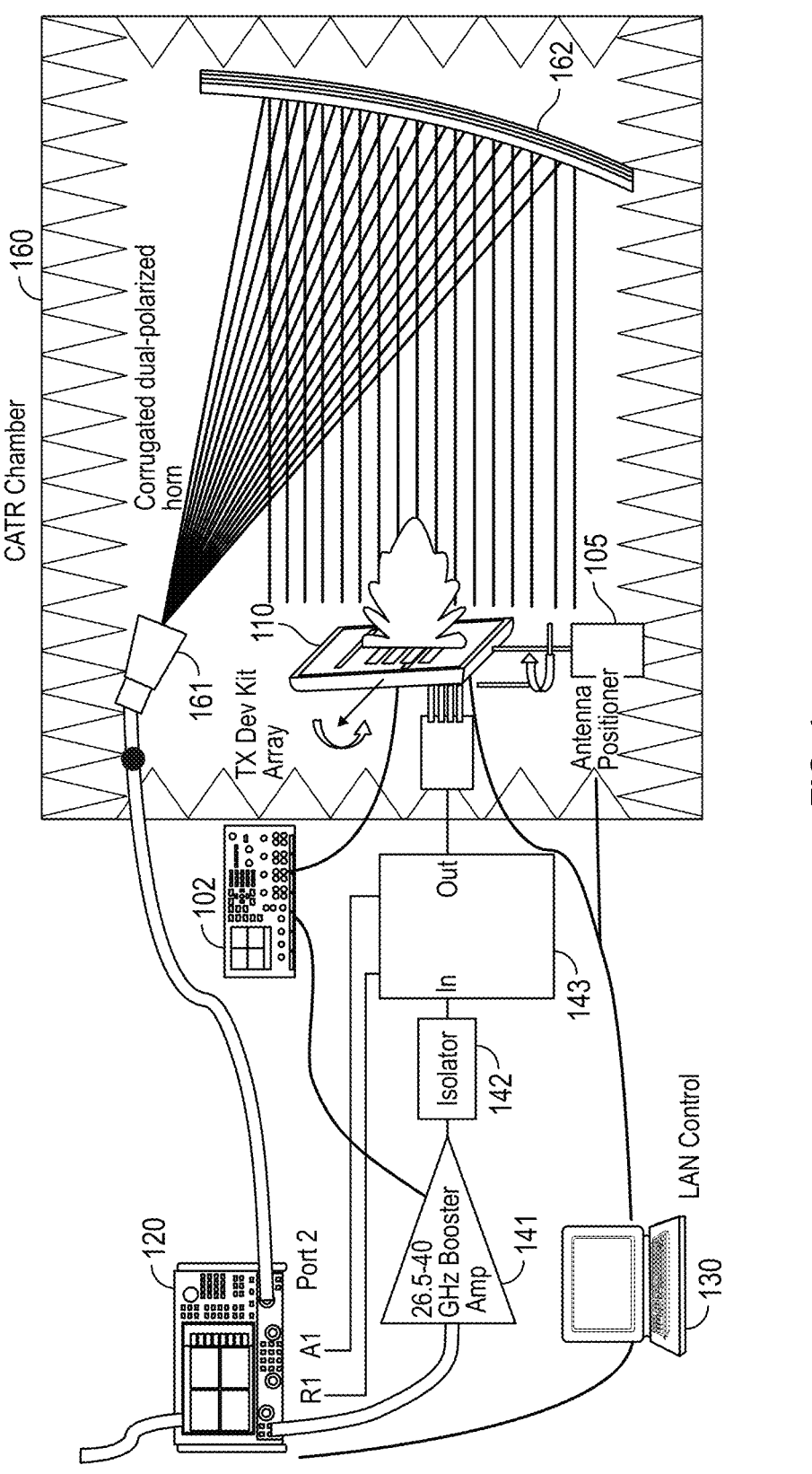
FIG. 1 illustrates a system for antenna array measurement and calibration, in accordance with a representative embodiment.

In the following detailed description, for the purposes of explanation and not limitation, representative embodiments disclosing specific details are set forth in order to provide a thorough understanding of embodiments according to the present teachings. However, other embodiments consistent with the present disclosure that depart from specific details disclosed herein remain within the scope of the appended claims. Descriptions of known systems, devices, materials, methods of operation and methods of manufacture may be omitted so as to avoid obscuring the description of the representative embodiments. Nonetheless, systems, devices, materials and methods that are within the purview of one of ordinary skill in the art are within the scope of the present teachings and may be used in accordance with the representative embodiments. It is to be understood that the terminology used herein is for purposes of describing particular embodiments only and is not intended to be limiting. Definitions and explanations for terms herein are in addition to the technical and scientific meanings of the terms as commonly understood and accepted in the technical field of the present teachings.

It will be understood that, although the terms first, second, third etc. may be used herein to describe various elements or components, these elements or components should not be limited by these terms. These terms are only used to distinguish one element or component from another element or component. Thus, a first element or component discussed below could be termed a second element or component without departing from the teachings of the inventive concept.

As used in the specification and appended claims, the singular forms of terms 'a', 'an' and 'the' are intended to include both singular and plural forms, unless the context clearly dictates otherwise. Additionally, the terms "comprises", and/or "comprising," and/or similar terms when used in this specification, specify the presence of stated features, elements, and/or components, but do not preclude the presence or addition of one or more other features, elements, components, and/or groups thereof. As used herein, the term "and/or" includes any and all combinations of one or more of the associated listed items.

Unless otherwise noted, when an element or component is said to be "connected to", "coupled to", or "adjacent to" another element or component, it will be understood that the element or component can be directly connected or coupled to the other element or component, or intervening elements or components may be present. That is, these and similar terms encompass cases where one or more intermediate elements or components may be employed to connect two elements or components. However, when an element or component is said to be "directly connected" to another element or component, this encompasses only cases where the two elements or components are connected to each other without any intermediate or intervening elements or components.

The present disclosure, through one or more of its various aspects, embodiments and/or specific features or sub-components, is thus intended to bring out one or more of the advantages as specifically noted below.

As described herein, antenna array elements of an antenna array may be calibrated one at a time using registry values obtained from a vector network analyzer which measures the antenna array. Leakage of the antenna array may be reduced by one or more mechanisms including row cancellation for adjacent rows of antenna array elements of the antenna array, programmatic cancellation via a single offsetting antenna array element, and/or deembedding by subtraction of total leakage measured when the antenna array is set to minimum signal. Alone or collectively, these mechanisms allow for accurate calibration of a phased array antenna on an element-by-element basis.

FIG. 1 illustrates a system 100 for antenna array measurement and calibration, in accordance with a representative embodiment.

The system 100 in FIG. 1 is a system for antenna array measurement and calibration and includes components that are provided together when an antenna array is being tested. The system 100 includes a DC power supply 102, an antenna positioner 105, an antenna array 110, a VNA 120, a controller 130, a booster 141, an isolator 142, a coupler 143, and a CATR chamber 160. The CATR chamber 160 includes a horn antenna 161 and a mirror 162. The antenna positioner 105 and the antenna array 110 are placed within the CATR chamber 160 when the antenna array 110 is being tested.

The antenna array 110 comprises a plurality of antenna array elements each configured to individually radiate signals. The antenna array 110 may be part of an antenna array system with a controller as described with respect to FIG. 2A and FIG. 2B. The controller of an antenna array system that also includes the antenna array 110 is configured to obtain a list of registry values from the VNA 120, and perform an iterative process including setting the antenna array 110 based on registry values from the list of registry values to meet a predetermined criterion.

The DC power supply 102 provides power to the antenna array 110 during testing. The antenna positioner 105 positions the antenna array 110 in one or more degrees of freedom during testing. The horn antenna 161 emits a signal to measure an antenna array element in receive mode or receives an antenna signal in transmit mode. The signal is incident on the mirror 162, and the mirror 162 reflects the directed beam towards the antenna array. The CATR chamber 160 is a compact antenna test range chamber, and the compactness provided by the CATR chamber 160 is enabled in part by the use of the mirror 162.

The VNA 120 is a vector network analyzer, and is used control the horn antenna 161 to emit test signals to test the antenna array 110 and to detect test signals emitted from the antenna array 110. The VNA includes interfaces to connect to the controller 130, the booster 141, the coupler 143, and the CATR chamber 160. The VNA 120 is controlled by the controller 130. The VNA 120 and the controller 130 may be provided as separate components or may be integrated together.

Figure 2A:
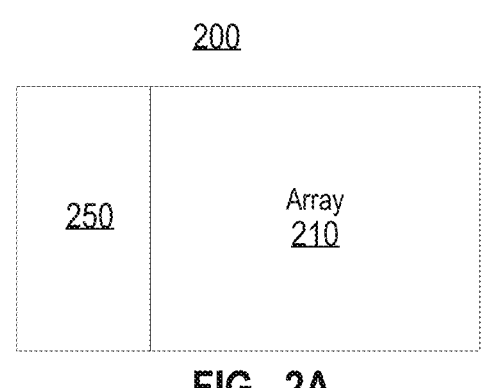
FIG. 2A illustrates an antenna system for antenna array measurement and calibration, in accordance with a representative embodiment.
Figure 2B:
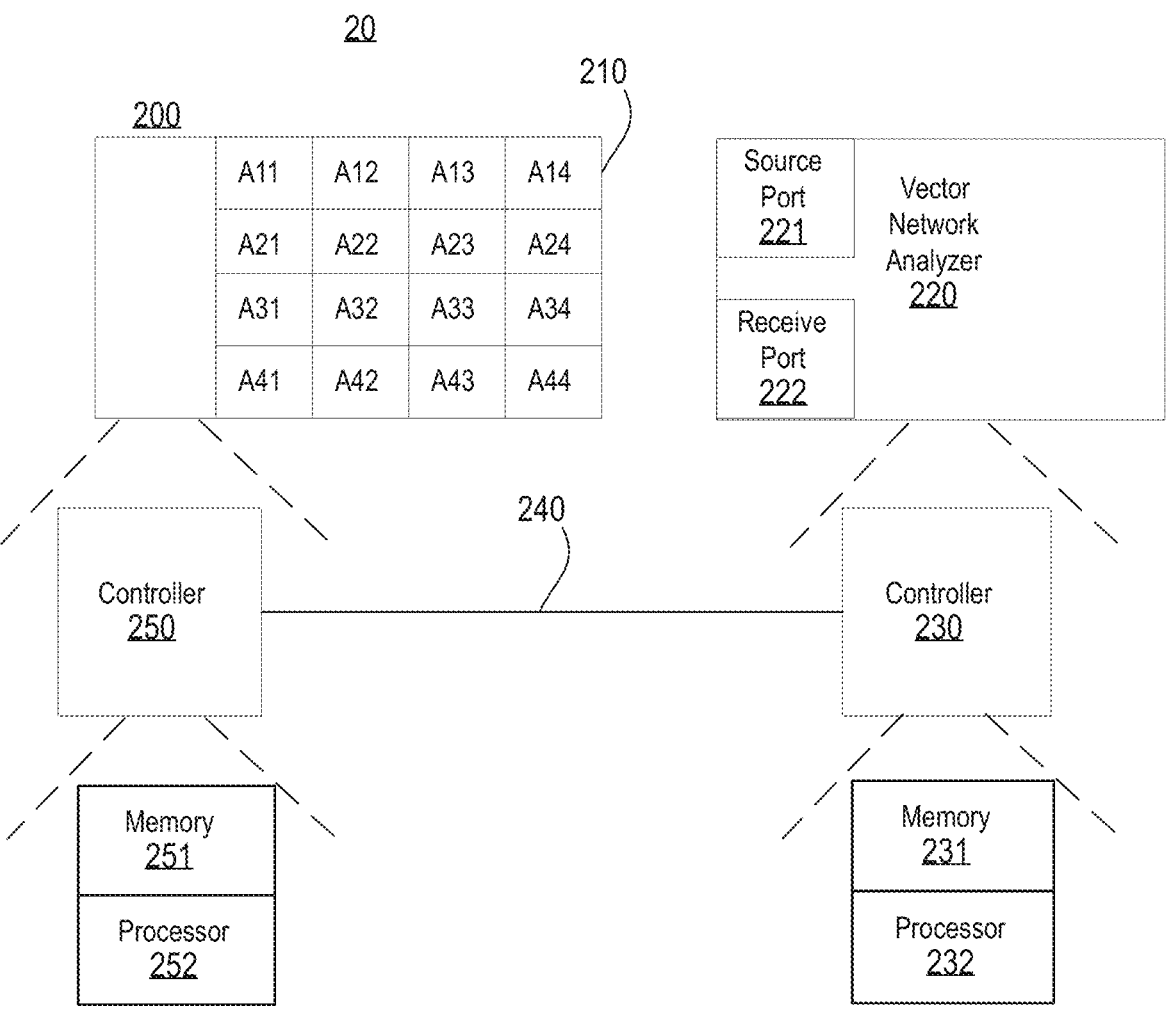
FIG. 2B illustrates another system for antenna array measurement and calibration, in accordance with a representative embodiment.

A controller used to implement the controller 130 is described in more detail with respect to the controller 230 in FIG. 2B. In FIG. 1, the controller 130 is shown as a laptop computer that controls the antenna positioner 105 and the antenna array 110 via a local area network (LAN).

The booster 141 boosts signals from the VNA 120 to the antenna array 110. In FIG. 1, the booster 141 may comprise a 26.5-40 GHz booster amplifier. The isolator 142 provides electrical isolation between the VNA 120 and the antenna array 110. The coupler 143 samples RF signals at a predetermined degree of coupling between the sampled ports of the antenna array 110 and signal ports of the coupler 143. In FIG. 1, the coupler 143 is dual-directional.

FIG. 2A illustrates an antenna system for antenna array measurement and calibration, in accordance with a representative embodiment.

In FIG. 2A, the antenna array system 200 includes an antenna array 210 and an antenna array controller 250. The antenna array 210 includes 36 antenna array elements each configured to individually radiate signals. The antenna array controller 250 may be used to control each antenna array element in the antenna array 210.

Although the antenna array controller 250 is shown next to the antenna array 210, in embodiments herein such as in embodiments based on FIG. 1 and FIG. 2 the antenna array controller 250 may be placed relatively behind the antenna array 210, so between the antenna array 210 and the coupler 143 from FIG. 1 or other components behind the antenna array 210. In other embodiments, the antenna array controller 250 may be placed below, above or to the side of the antenna array 210, but generally the antenna array controller 250 is not placed between the antenna array elements of the antenna array 210 and any mirror in a CATR chamber as in FIG. 1.

A method of measuring and calibrating the antenna array system 200 includes obtaining a list of registry values from a vector network analyzer and performing an iterative process based on registry values from the list of registry values. The method performed by the antenna array controller 250 may include programming a number of antenna array elements to a phase and an equivalent number to a 180 degree phase shift from the phase. That is, when an antenna design has a 180 degrees phase shift between antenna array elements as a design attribute such that adjacent antenna array elements are programmed 180 degrees out of phase with each other, phase register values may be programmed to the same value.

FIG. 2B illustrates another system for antenna array measurement and calibration, in accordance with a representative embodiment.

In FIG. 2B, a system 20 includes the antenna array system 200 and a vector network analyzer 220.

The antenna array system 200 includes the antenna array 210 and the antenna array controller 250. The antenna array controller 250 includes a memory 251 that stores instructions and a processor 252 that executes the instructions. The antenna array 210 includes sixteen antenna array elements labelled A11 to A44, though an antenna array 210 may have fewer or many more antenna array elements than the sixteen shown in FIG. 2B.

An array driver chip may be placed between sets of adjacent rows of antenna array elements of the antenna array 210. For example, an array driver chip may comprise an integrated circuit chip, and may drive four antenna array elements with two of the four antenna array elements in the row above the array driver chip and two of the four antenna array elements in the row below the array driver chip. The antenna array 210 may include a plurality of such array driver chips, each used to drive different sets of antenna array elements such as different sets each with four antenna array elements. The antenna array elements of the antenna array 210 may be programmed by the antenna array controller 250, such that a method of measuring and calibrating the antenna array system may include programming antenna array elements of the antenna array 210 to specific phases.

The programming of the antenna array elements of the antenna array 210 may include programming phases of the antenna array elements by row to offset an array driver chip placed between adjacent rows of antenna array elements.

The vector network analyzer 220 includes a source port 221, a receive port 222, and a controller 230. The controller 230 includes a memory 231 that stores instructions and a processor 232 that executes the instructions.

In FIG. 2B, the controller 230 and the antenna array controller 250 are directly connected by the cable 240. The cable 240 is a wired digital connection representative of a hardwire digital connection between the controller 230 and the antenna array controller 250.

The antenna array controller 250 is configured to perform leakage compensation. The instructions stored in the memory 251 and executed by the processor 252 are configured to cause the processor 252 to perform leakage compensation as described herein.

The controller 230 and/or the antenna array controller 250 may each include interfaces, such as a first interface, a second interface, a third interface, and a fourth interface. One or more of the interfaces may include ports, disk drives, wireless antennas, or other types of receiver circuitry that connect the controller 230 and/or the antenna array controller 250 to other electronic components. One or more of the interfaces may also include user interfaces such as buttons, keys, a mouse, a microphone, a speaker, a display, or other components that users can use to interact with the controller 230 and/or the antenna array controller 250 such as to enter instructions and receive output.

The controller 230 may perform some of the operations described herein directly and may implement other operations described herein indirectly. For example, the controller 230 may indirectly control operations of the antenna array system 200 such as by generating and transmitting instructions to the antenna array controller 250. The controller 230 may directly control other operations such as logical operations performed by the processor 232 executing instructions from the memory 231 based on input received from electronic elements and/or users via the interfaces. Accordingly, the processes implemented by the controller 230 when the processor 232 executes instructions from the memory 231 may include steps not directly performed by the controller 230. Similarly, the antenna array controller 250 may perform some of the operations described herein directly and may implement other operations described herein indirectly.

The antenna array controller 250 is an antenna array controller used to control the antenna array 210. The antenna array controller 250 is configured to obtain a list of registry values from the controller 230 of the vector network analyzer 220, and perform an iterative process including setting the antenna array 210 based on registry values from the list of registry values. A method of measuring and calibrating the antenna array system 200 from FIG. 2 is performed by the antenna array controller 250. The method includes obtaining a list of registry values from a vector network analyzer and performing an iterative process based on registry values from the list of registry values. The method performed by the antenna array controller 250 may include programming a number of antenna array elements to a phase and an equal number to a 180 degree phase shift from the phase.

In the system 20, the controller 230 and the antenna array controller 250 are directly interfaced. The antenna array controller 250 is integrated with the antenna array 210, and the antenna array controller 250 takes commands for addressing individual antenna array elements of the antenna array 210. The antenna array controller 250 is provided with one or more register(s) to store the magnitude and phase for each antenna array element. A number of registry values received by the antenna array controller 250 from the controller 230 of the vector network analyzer 220 in the list of registry values may be equal to a number of register states of the register(s). The antenna array controller 250 is enabled to send and receive digital hardware control signals, such as TTL level triggers. The antenna array controller 250 is programmed to receive a list of registry values, along with the ability to sense an input signal from the vector network analyzer 220, and to send an output signal to the vector network analyzer 220. The controller 230 of the vector network analyzer 220 is programed so that the number of measurement points equals the number of register states, and may be set to trigger a measurement for one point for each digital output trigger. At the end of the data acquisition of the measurement point, the controller 230 of the vector network analyzer 220 is configured to send a digital signal back to the antenna array controller 250 indicating "measurement complete, ready for next point". The antenna array controller 250 of the antenna array system 200 is then programmed to set the first register point, and send a digital trigger to the vector network analyzer 220 to trigger the first measurement point, and wait for the measurement ready signal. When the measurement ready digital signal changes state, indicating that the measurement on the vector network analyzer 220 is complete and ready to take new data, the antenna array controller 250 loads the next registry value to the antenna array 210 and triggers a new measurement. This continues until the registry list is exhausted.

The overhead associated with control through legacy alternative such as through a local area network (LAN) or via USB control is typically 10-20 milliseconds. Because there is no software communications, such as through LAN or USB control, the overhead associated with such control is eliminated in the system 20. The digital trigger control has a latency on the order of a few microseconds. And the measurement by the vector network analyzer 220 may be as fast as a few microseconds, meaning the measurement time per point can be 100 to 1000 times faster than using traditional software control.

Additionally, leakage is addressed in the antenna array system 200 in order to ensure the ability to discern a phase response of a single antenna array element from the rest of the antenna array 210. Leakage is addressed in order to ensure accurate measurement of the element-by-element power and phase. Since several different methodologies are provided herein to address leakage, the description of these mechanisms is largely provided later with respect to the method of FIG. 9. Based on the ability to address leakage, the antenna array controller 250 is able to perform an iterative process to calibrate the antenna array system 200 such as to meet a predetermined criterion. The antenna array controller 250 may obtain a list of registry values from the vector network analyzer 220 via the controller 230. The iterative process then performed by the antenna array controller may include setting the antenna array 210 based on a registry value from the list of registry values, sending a trigger to the vector network analyzer 220 via the controller 230 to trigger a measurement of the antenna array 210 for the registry value, and wait for a measurement ready signal from the vector network analyzer 220 indicating that the measurement is complete. The registry value may be one or more registry values for one or more antenna array elements, so that the iterative process may be performed for one antenna array element at a time or for more than one antenna array element at a time. The method performed by the antenna array controller 250 may further include programming a number of antenna array elements of the antenna array 210 to a phase and an equal number of antenna array elements of the antenna array 210 to a 180 degree phase shift from the phase such that adjacent antenna array elements are programmed 180 degrees out of phase with each other. The phase may be configured to cancel the leakage level of the antenna array. The antenna array controller 250 may also program each of the antenna array elements of the antenna array 210 to a magnitude corresponding to a leakage level of the antenna array. For example, each row of antenna array elements in the antenna array 210 may be programmed with the same phase to offset an array driver chip placed between adjacent rows of antenna array elements.

As set forth above, the controller 230 and/or the antenna array controller 250 are used implement the methods described herein. A memory described herein (e.g., memory 231 and/or memory 251) may include a main memory and/or a static memory, where such memories may communicate with each other and other components of a controller via one or more buses. The memory stores instructions used to implement some or all aspects of methods and processes described herein. The memory may be implemented by any number, type and combination of random access memory (RAM) and read-only memory (ROM), for example, and may store various types of information, such as software algorithms, which serve as instructions, which when executed by a processor cause the controller to perform various steps and methods according to the present teachings. Furthermore, updates to the methods and processes described herein may also be stored in memory.

The various types of ROM and RAM may include any number, type and combination of computer readable storage media, such as a disk drive, flash memory, an electrically programmable read-only memory (EPROM), an electrically erasable and programmable read only memory (EEPROM), registers, a hard disk, a removable disk, tape, compact disk read only memory (CD-ROM), digital versatile disk (DVD), floppy disk, Blu-ray disk, a universal serial bus (USB) drive, or any other form of storage medium known in the art. The memory 231 and the memory 251 are each a tangible storage medium for storing data and executable software instructions, and are non-transitory during the time software instructions are stored therein. As used herein, the term "non-transitory" is to be interpreted not as an eternal characteristic of a state, but as a characteristic of a state that will last for a period. The term "non-transitory" specifically disavows fleeting characteristics such as characteristics of a carrier wave or signal or other forms that exist only transitorily in any place at any time. The memory 231 and memory 251 may store software instructions and/or computer readable code (collectively referred to as 'instructions') that enable performance of various functions of the system 20 or other systems described herein for other embodiments. The memory 231 and memory 251 may be secure and/or encrypted, or unsecure and/or unencrypted.

"Memory" is an example of computer-readable storage media, and should be interpreted as possibly being multiple memories. The memory for instance may be multiple memories or databases local to the system 20, and/or distributed amongst multiple computer systems or computing devices, or disposed in the 'cloud' according to known components and methods. A computer readable storage medium is defined to be any medium that constitutes patentable subject matter under 35 U.S.C. § 101 and excludes any medium that does not constitute patentable subject matter under 35

U.S.C. § 101. Examples of such media include non-transitory media such as computer memory devices that store information in a format that is readable by a computer or data processing system. More specific examples of non-transitory media include computer disks and non-volatile memories.

The controller 230 and the antenna array controller 250 described herein are representative of one or more processing devices, and are configured to execute software instructions stored in memory to perform functions as described in the various embodiments herein. The processor 232 and processor 252 may be implemented by field programmable gate arrays (FPGAs), application specific integrated circuits (ASICs), systems on a chip (SOC), a general purpose computer, a central processing unit, a computer processor, a microprocessor, a graphics processing unit (GPU), a microcontroller, a state machine, programmable logic device, or combinations thereof, using any combination of hardware, software, firmware, hard-wired logic circuits, or combinations thereof. Additionally, any processing unit or processor herein may include multiple processors, parallel processors, or both. Multiple processors may be included in, or coupled to, a single device or multiple devices.

The term "processor" as used herein encompasses an electronic component able to execute a program or machine executable instruction. References to a device comprising "a processor" should be interpreted to include more than one processor or processing core, as in a multi-core processor. A processor may also refer to a collection of processors within a single computer system or distributed among multiple computer systems, such as in a cloud-based or other multi-site application. The term computing device should also be interpreted to include a collection or network of computing devices each including a processor or processors. Modules have software instructions to carry out the various functions using one or multiple processors that may be within the same computing device or which may be distributed across multiple computing devices.

FIG. 3 illustrates a user interface for antenna array measurement and calibration, in accordance with a representative embodiment.

The user interface 381 in FIG. 3 may be provided on a screen of the controller 130 in FIG. 1 or the controller 230 in FIG. 3B. The user interface 381 illustrates status and temperature for each antenna array element in an antenna array with 256 antenna array elements. In FIG. 3, the antenna array elements are arranged in a 16×16 square. The user interface 381 in FIG. 3 shows a heat map for the antenna array, and is provided for testing which chips of the antenna array respond. Notably, in the illustrative arrangement in FIG. 3, squares 67, 68, 83, 84 and squares 101, 102, 117, 118 represent non-responsive antenna array elements, whereas the remaining squares represent responsive antenna array elements. For this example, a single integrated circuit (IC) chip controls four radiating elements so a non-responsive integrated circuit chip will affect four elements. For example, squares 67, 68, 83 and 84 may be shown in red and squares 101, 102, 117 and 118 may be shown in red, whereas all other squares may be shown in green.

Several distinct methods for addressing are leakage are described below.

Figure 4:
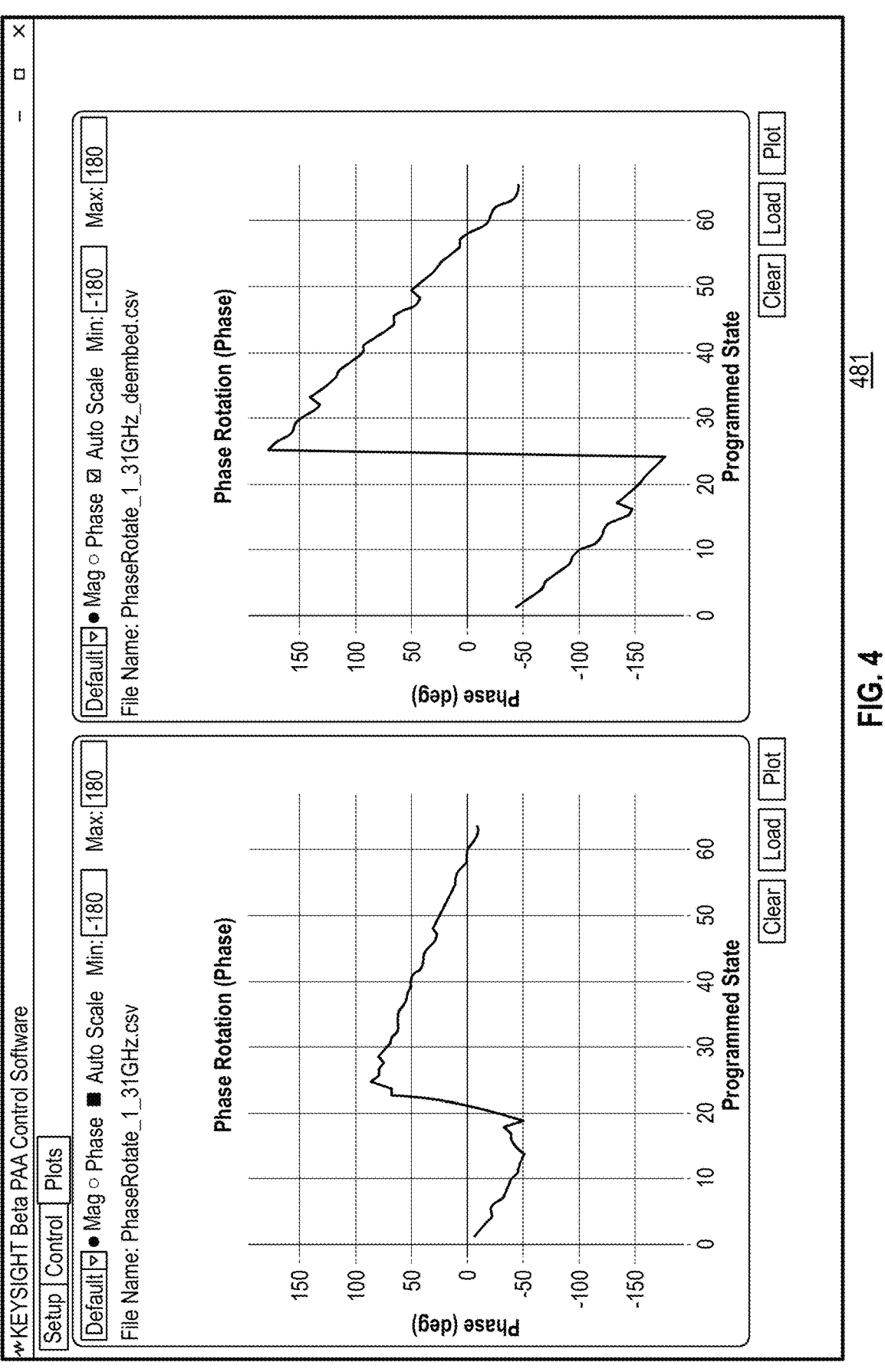
FIG. 4 illustrates another user interface for antenna array measurement and calibration, in accordance with a representative embodiment.

FIG. 4 illustrates another user interface for antenna array measurement and calibration, in accordance with a representative embodiment.

FIG. 4 illustrates a phase error resulting from a control solution for leakage described below. On the left, the user interface 481 shows the result of compensating for leakage with a first mechanism described with respect to 920 in the method of FIG. 9. For example, between the programmed states of approximately 15 and 22 on the left, leakage is dominating as reflected by the phase increasing against the trend which should be dropping. The leakage compensation described with respect to 920 in the method of FIG. 9 involves using the antenna array controller 250 to counteract an effect of array driver chips placed between array rows, and is explained more below. On the right, the user interface 481 shows the result of compensating for leakage, and this is reflected by phase dropping with the trend between the programmed states of approximately 15 and 22. While the compensation between the programmed states of approximately 15 and 22 is most notable between the two sides of the user interface 481 in FIG. 4, the effect of leakage compensation on the right of the user interface 481 in FIG. 4 is reflected throughout the 64 program states. The right figure on the user interface 481 shows the effect of compensation using the de-embedding method as described with respect to 960 in the method of FIG. 9. The leakage compensation described with respect to 960 in the method of FIG. 9 involves de-embedding an array leakage by subtracting the array leakage from the measured data. Among other improvements, as shown in the graph on the right side of the user interface 481 in FIG. 4, the phase response after de-embedding is linear as a function of phase states compared to the phase response in the graph on the left side of the user interface 481 in FIG. 4. By way of illustration, phase states 0-64 correspond to 0-360 degrees with resolution of approximately 5.625 degrees.

In terms of counteracting the effect of array driver chips placed between rows, the antenna array 210 may have a design with rows and columns of antenna array elements as in the representation of antenna arrays in FIG. 2B and on the user interface 381 in FIG. 3. For example, the antenna array 210 may have a square design with an equal number of rows and columns. Due to layout considerations, every other row of the antenna array 210 may include a radiating antenna array element which is fed 180 degrees out of phase with the adjacent row. This is because the effect phase of radiating antenna array elements, typically patch antennas, changes by 180 degrees when fed from the top or bottom of the patch. Array driver chips may be placed between array rows of the antenna array 210, the bottom of the upper row and the top of the lower row may be fed. The antenna array controller 250 may take this into account and automatically add a 180 degrees phase shift programmatically to every other row. To leverage this, the antenna array 210 may be programmed with the same phase for every row, producing the effect that the signal from every other row cancels the adjacent row. That is, when an antenna design has a 180 degrees phase shift between antenna array elements as a design attribute, phase register values may be programmed by the antenna array controller 250 to the same value.

The leakage of the array is reduced by approximately 20 decibels when programming the same phase for every other row. For a sample array with 32 decibels of attenuation control and 256 antenna array elements, this means that the leakage from the array is approximately two decibels below the level of a signal antenna array element at minimum attenuation. In measuring the amplitude and phase variation of the array, this may lead to an amplitude variation error of +5.1 decibels to −13 decibels; and a phase variation of +−38 degrees. The minimum level of attenuation for each antenna array element may be on the order of minus 30 decibels.

A leakage de-embedding method may also be applied to improve the response of the antenna array 210 in the presence of leakage. In this method, before programming the antenna array 210 for phase sweep, the antenna array 210 is programmed for minimum signal, and the measured total leakage, magnitude and phase, are recorded with all antenna array elements of the antenna array 210 set to the minimum level. The value recorded with all antenna array elements of the antenna array 210 set to the minimum level is subtracted using vector math from all subsequent measurements, and improves the leakage response by approximately 20 decibels. The array leakage is on the order of –22 decibels lower than the maximum signal of a single radiator. This results in reducing the magnitude error to approximately +–0.7 decibels and +–5 degrees.

Figure 5:
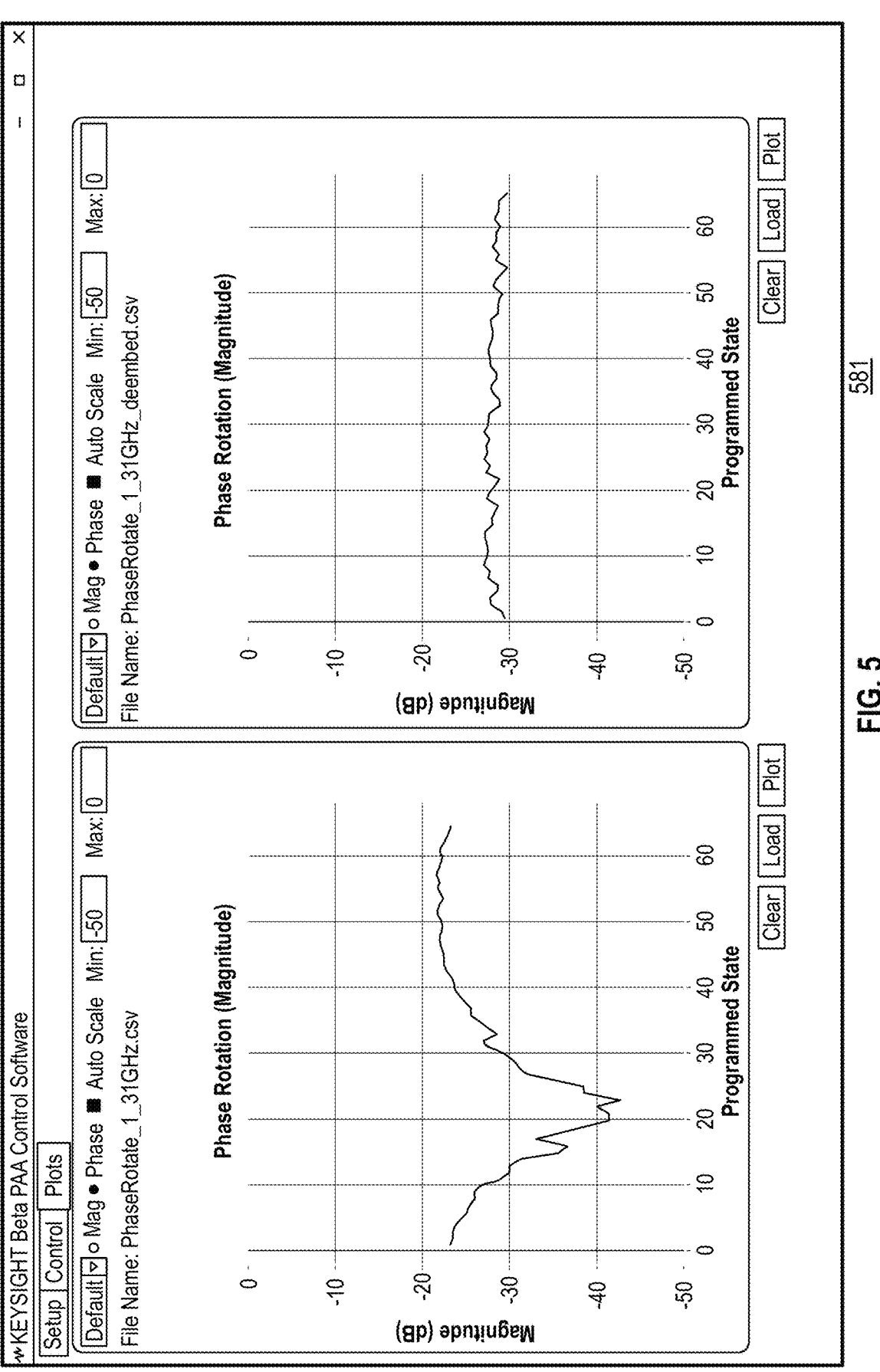
FIG. 5 illustrates another user interface for antenna array measurement and calibration, in accordance with a representative embodiment.

FIG. 5 illustrates another user interface for antenna array measurement and calibration, in accordance with a representative embodiment.

FIG. 5 illustrates amplitude error resulting from the control solutions described above with respect to FIG. 4. The amplitude error on the left of the user interface 581 shows the result of counteracting the effect of array driver chips placed between rows. The amplitude error on the right of the user interface 581 shows the result of both counteracting the effect of array driver chips placed between rows and the effect of deembedding an array leakage by subtracting the array leakage from the measured data. Leakage which is shown on the left in the user interface 581 is greatly reduced by the leakage compensation from deembedding shown on the right in the user interface 581.

Still another leakage cancellation solution may also be provided after the control solution and before the leakage deembedding described above. This third leakage cancellation solution is described with respect to 930, 935, 940 and 945 in the method of FIG. 9. In the leakage cancellation solution, one of the antenna array elements of the antenna array 210 is programmed to a magnitude level similar to the leakage level and a phase which cancels the array leakage. Programming to a magnitude level similar to the leakage level is possible when the leakage is lower than the maximum of a single antenna array element. The leakage cancellation solution may reduce the leakage by between 10 decibels and 20 decibels. Leakage cancellation may be applied after the control solution. When leakage deembedding is subsequently applied, the leakage effect may be reduced by as much as 40 decibels, leaving approximately 0.1 decibels error in amplitude and less than 1 degree error in phase.

Figure 6:
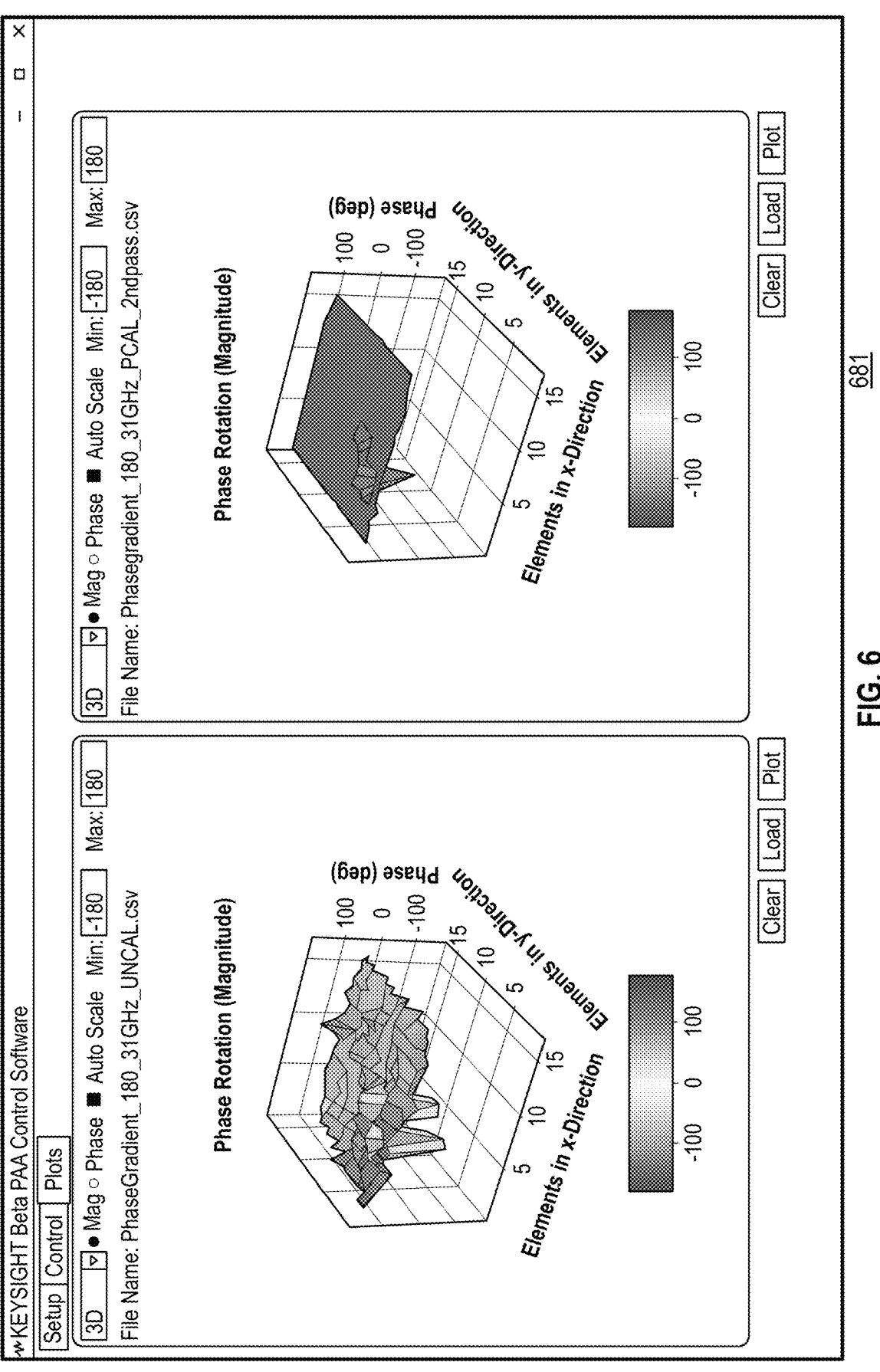
FIG. 6 illustrates another user interface for antenna array measurement and calibration, in accordance with a representative embodiment.

FIG. 6 illustrates another user interface for antenna array measurement and calibration, in accordance with a representative embodiment.

The user interface 681 in FIG. 6 shows an uncalibrated array phase gradient on the left, and a calibrated array phase gradient on the right. FIG. 6 showed the results of calibration using the compensation array created using the teachings herein on a sample antenna array measurement, before and after array calibration. On the left of the user interface 681, the areas with the notable drops in phase correspond to the non-responsible squares 67, 68, 83, 84 and squares 101, 102, 117, 118 in FIG. 3. whereas the remaining squares represent responsive antenna array elements. For implementation of phase calibration, after leakage deembedding is applied, a registry list of desired antenna array elements may be created. The registry list may include up to all the antenna array elements of the antenna array 210 in a single list. Each desired radiator antenna array element of the antenna array 210 is cycled through gain/phase settings and the results are recorded. A compensation array may be created and applied to the antenna array 210, and the compensation array may remove the effects of amplitude and phase deviation in the antenna array 210. FIG. 6 shows the results on a sample measurement on the antenna array 210, before and after array calibration whereas on the left of the user interface 681 the uncalibrated array phase gradient is relatively rough compared to the calibrated array phase gradient which is relatively flat on the right of the user interface 681.

Figure 7A:
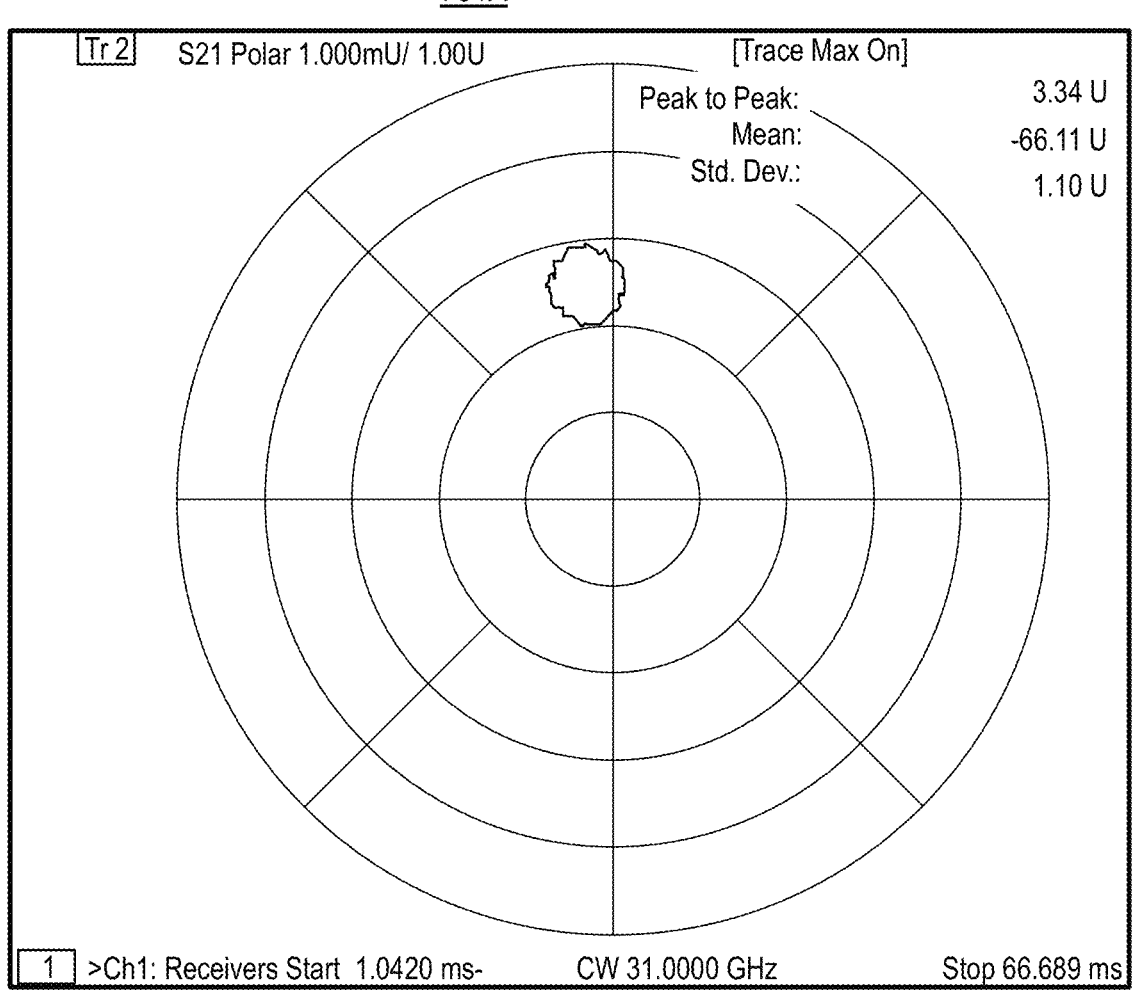
FIG. 7A illustrates another user interface for antenna array measurement and calibration, in accordance with a representative embodiment.
Figure 7B:
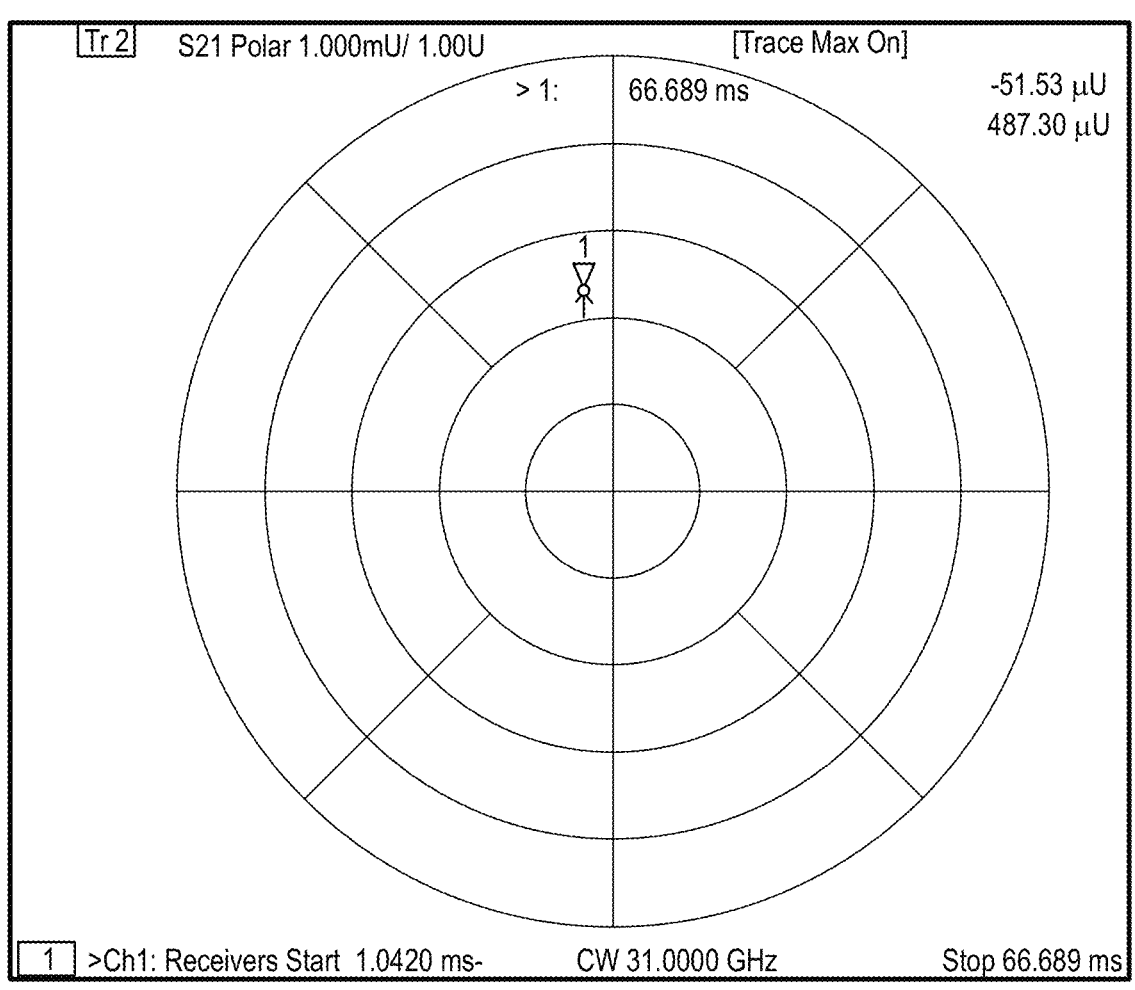
FIG. 7B illustrates another user interface for antenna array measurement and calibration, in accordance with a representative embodiment.
Figure 7C:
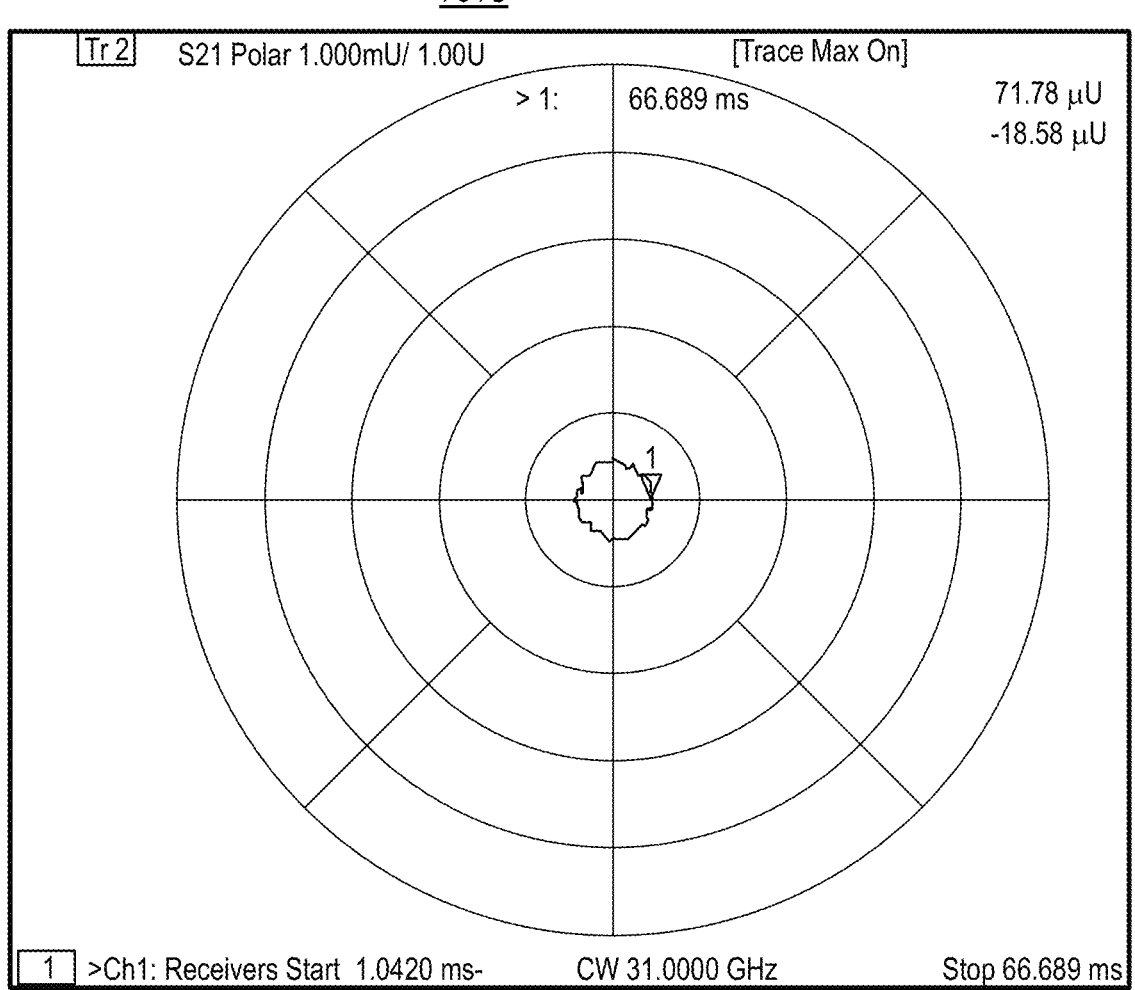
FIG. 7C illustrates another user interface for antenna array measurement and calibration, in accordance with a representative embodiment.

FIG. 7A illustrates another user interface for antenna array measurement and calibration, in accordance with a representative embodiment. FIG. 7B illustrates another user interface for antenna array measurement and calibration, in accordance with a representative embodiment. FIG. 7C illustrates another user interface for antenna array measurement and calibration, in accordance with a representative embodiment.

FIG. 7A is a representation of the vector (the magnitude and phase) response of a single antenna element (or group of antenna array elements) when rotated through 360 degrees of phase shift, when that single antenna element (or group of antenna array elements) is at maximum and all the other elements are at minimum. The 360 degree phase rotation about a center point as it forms a circle is readily recognized. However the typical understanding is the phase is measured from the center of the chart, and as such it appear the phase of this response only traverses about 18 degrees and the magnitude traverses from 0.75 to 1.25. The rough circle above the center of the circle on the user interface 781A represents the combination of leakage of the array and the contribution of the element being tested.

FIG. 7B shows the response (the magnitude and phase) when all the antenna array elements are set to their minimum value. It is clear from the user interface 781B that the leakage is close to the center of the circle from the user interface 781A in 7A.

FIG. 7C shows the result of vector (the magnitude and phase) subtraction of the plot of FIG. 7B from the plot of FIG. 7A, and this corresponds to subtracting the leakage of the antenna array as a whole when all antenna array elements are set to the minimum value from the phase measurement of the individual (or group) of antenna array elements in FIG. 7A. Now the phase is centered and the phase readout will clearly show 360 degrees of variation rather than 18 degrees. Moreover, the magnitude is nearly constant, indicating the magnitude of this antenna array element does not change much with the phase of the antenna array element.

Figure 8:
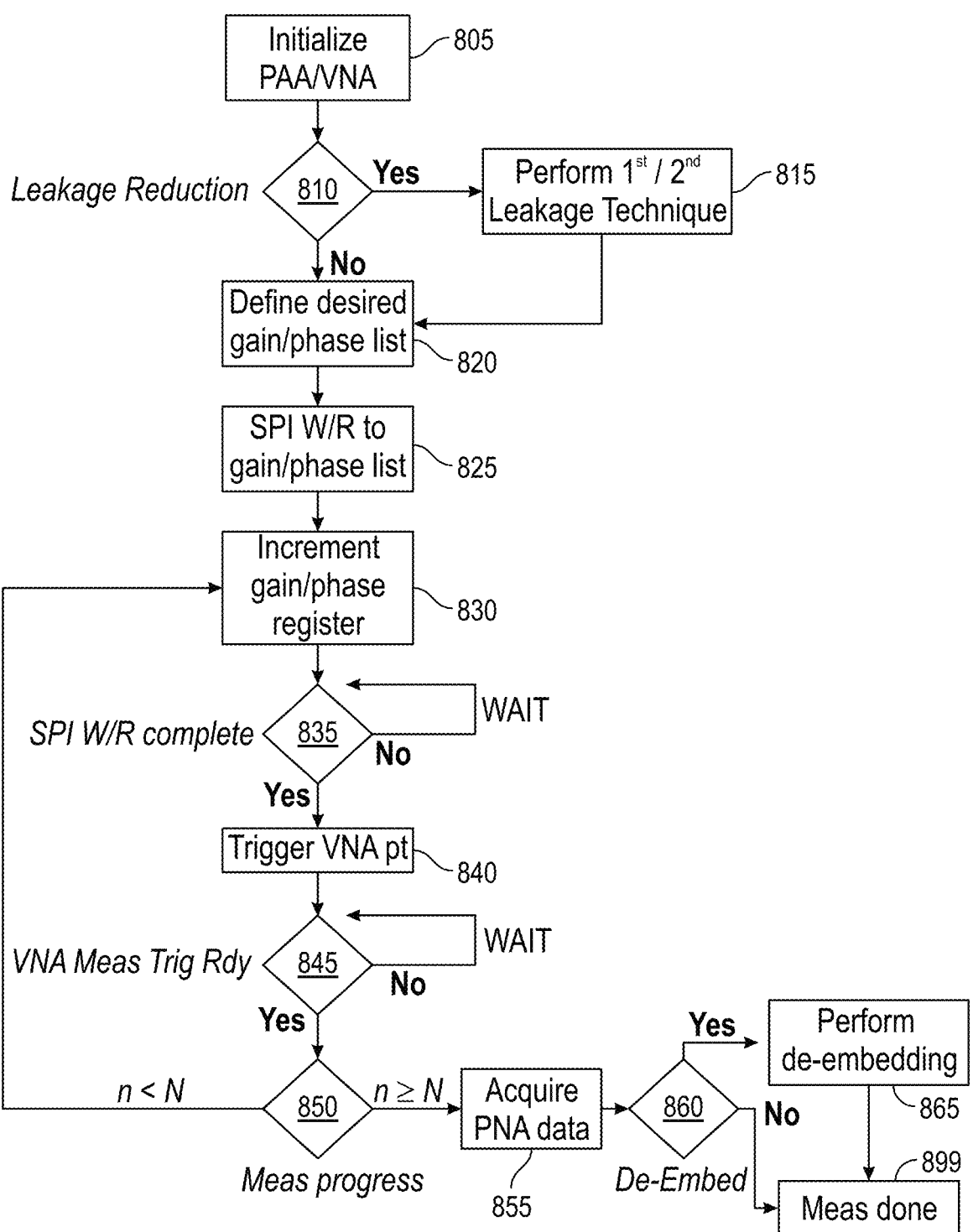
FIG. 8 illustrates a method for antenna array measurement and calibration, in accordance with a representative embodiment.

FIG. 8 illustrates a method for antenna array measurement and calibration, in accordance with a representative embodiment.

At 805, a phased array antenna (PAA) and a vector network analyzer (VNA) are initialized. The phased array antenna may be the antenna array 210 and the antenna array controller 250 of FIG. 2A and FIG. 2B. The vector network analyzer may be the vector network analyzer 220 of FIG. 2A and FIG. 2B.

At 810, a determination is made as to whether leakage reduction is to be performed. The determination at 810 may be a determination as to whether phase cancellation by row of antenna array elements and/or programmatic cancellation via a single offsetting antenna array element of the antenna array elements is/are to be performed. Phase cancellation by row of antenna array elements is described with respect to 920 in FIG. 9, and programmatic cancellation via a single offsetting antenna array element of the antenna array elements is described with respect to 930, 935, 940 and 945 in FIG. 9.

At 815, a first and/or second leakage technique are performed if leakage reduction is required (810=Yes). The first leakage technique is the phase cancellation by row of antenna array elements, and the second leakage technique is the programmatic cancellation via a single offsetting antenna array element.

At 820, the list of desired gain and phase is defined, either after leakage reduction is performed at 815 if required, or otherwise after 810. The desired gain and phase may be set for the antenna array 210 as a whole. 820 may be performed via the controller 130 in FIG. 1 or the controller 230 in FIG. 2B.

At 825, a serial port interface (SPI) is established with the antenna array 210 with respect to the gain/phase list. Notably, SPI is a protocol that the Raspberry Pi controller uses, and may be used by the antenna array controller 250 to control the phased antenna array registers. SPI write/read (W/R) refers to writing to phased antenna array registers and reading back those values.

For example, the controller 230 may be directly connected to the antenna array controller 250 via a wired digital connection such as the cable 240. The antenna array controller 250 may obtain a list of register values from the vector network analyzer 220 via the controller 230 at 825.

At 830, the gain/phase register is incremented, starting from a default value of 0. The gain/phase register may be incremented each time the iterative process for setting the antenna array 210 based on a registry value is performed At 835 a determination is made as to whether the serial peripheral interface (SPI) W/R is complete. If the SPI W/R is not complete (835=No), the method of FIG. 8 includes waiting until the SPI W/R is complete.

At 840, a VNA point is triggered. The antenna array controller 250 may send a trigger signal to the vector network analyzer 220 to trigger a measurement of the antenna array for the current registry value at 840. The current registry value may correspond to one antenna array element or to more than one antenna array element. The vector network analyzer 220 may measure one antenna array element at a time, or may measure sets of more than one antenna array element at a time.

At 845, a determination is made as to whether a VNA measuring trigger is ready. At 845, the antenna array controller 250 waits for a response from the vector network analyzer 220. The response from the vector network analyzer 220 may comprise a measurement ready signal indicating that the current measurement is complete.

At 850, a determination is made as to whether measurement progress is sufficient to complete the method of FIG. 8. 850 may include determining whether all of the antenna array elements to be measured individually using the calibration array described herein have been measured. If not (850=No), the process returns to 830 to increment the gain/phase register and initiate the iterative process for the next antenna array element.

Otherwise (850=Yes), PNA data is acquired at 855. The PNA data is acquired from the vector network analyzer 220 via the controller 230, and includes the measurement results of the measurements of the antenna array elements by the vector network analyzer 220.

At 860, a determination is made as to whether deembedding is required.

If deembedding is required (860=Yes), deembedding is performed at 865. The deembedding may involve subtracting the array leakage from the measured data for each antenna array element. The array leakage is the leakage for the antenna array as a whole when all of the antenna array elements are set to minimum power.

At 899, the measuring is done. The method of FIG. 8 involves an iterative process for measuring individual antenna array elements of an antenna array using a list of registry values, and while addressing and eliminating leakage using one or more of the mechanisms described herein.

Figure 9:
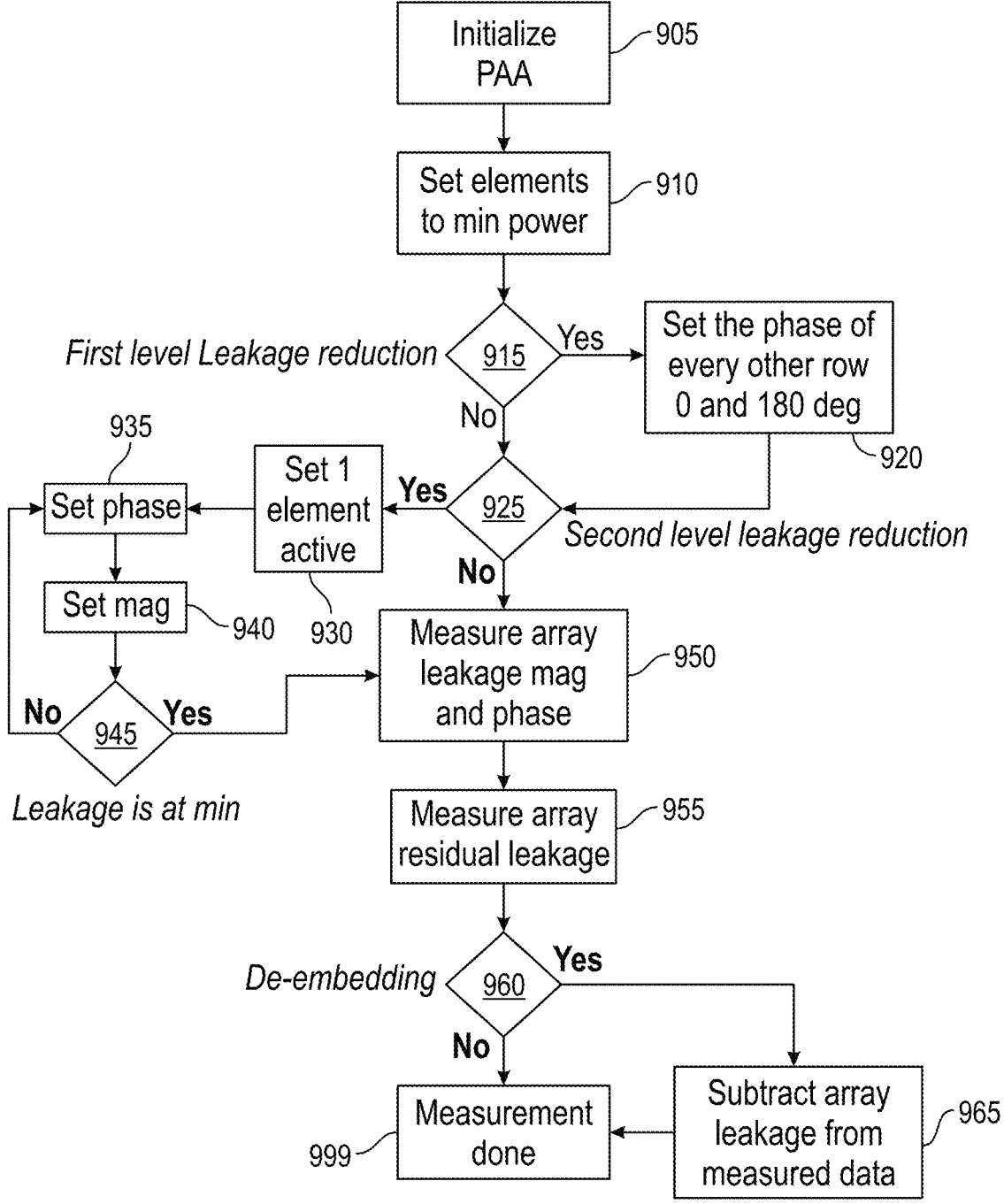
FIG. 9 illustrates another method for antenna array measurement and calibration, in accordance with a representative embodiment.

FIG. 9 illustrates another method for antenna array measurement and calibration, in accordance with a representative embodiment.

The method of FIG. 9 may be performed directly or indirectly by the antenna array controller 250 in FIG. 2 along with the controller 230 of the vector network analyzer 220.

At 905, a phased array antenna (PAA) is initialized. The phased array antenna initialized at 905 may comprise the antenna array 210 and the antenna array controller 250 of FIG. 2A and FIG. 2B.

At 910, antenna array elements of the phased array antenna are set to minimum power. The antenna array controller 250 may adjust all antenna array elements of the antenna array 210 to a minimum amplitude at S910. Afterwards, a leakage level of the antenna array 210 as a whole may be measured in magnitude and phase to obtain a leakage measurement.

At 915, a determination is made as to whether to perform first level leakage reduction. the antenna array 210 may have a square design with an equal number of rows and columns. The first level leakage reduction may be considered a phase cancellation method. Due to layout considerations, every other row of the antenna array 210 may include a radiating antenna array element which is fed 180 degrees out of phase with the adjacent row. This is because the effect phase of radiating antenna array elements, typically patch antennas, changes by 180 degrees when fed from the top or bottom of the patch. Array driver chips may be placed between array rows of the antenna array 210, such that the bottom of the upper row and the top of the lower row may be fed, resulting in adjacent array rows being offset by 180 degrees. Conventionally, the antenna array controller 250 takes this into account and automatically adds a 180 degrees phase shift programmatically to every other row. In the phase cancellation method, the antenna array 210 may be programmed with the same phase for every row, producing the effect that the signal from every other row is allowed to cancel the adjacent row. That is, the antenna array controller 250 is programmed not to add the 180 degree phase shift programmatically to every other row when performing the first level leakage reduction in the method of FIG. 9.

At 920, the phases of rows are set to 0 degrees or 180 degrees, such that each row set to one of 0 degrees or 180 degrees is adjacent only to rows set to the other of 0 degrees or 180 degrees. Using the phase cancellation method based on allowing the phases of the rows to alternate without the antenna array controller 250 automatically adding the 180 degree phase shift programmatically, the leakage of the antenna array 210 may be reduced by approximately 20 decibels. For a sample array with 32 decibels of attenuation control and 256 antenna array elements, this means that the leakage from the antenna array 210 is approximately two decibels below the level of a single antenna array element at minimum attenuation. In measuring the amplitude and phase variation of the array, this may lead to an amplitude variation error of +5.1 decibels to −13 decibels; and a phase variation of +−38 degrees. The amplitude error was shown in FIG. 5 and the phase error was shown in FIG. 4.

At 925, a determination is made as to whether to perform second level leakage reduction.

At 930, one antenna array element is set to active. At 930, 935 and 940, the antenna array controller 250 may operate by programming an antenna array element or a group of multiple antenna array elements to a magnitude corresponding to a leakage level of the antenna array and a phase which cancels the leakage level of the antenna array. The leakage reduction at 930, 935 and 940 may comprise programmatic cancellation via a single offsetting antenna array element or a group of multiple array elements. At 935, the phase of the one active antenna array element is set. At 940, magnitude of the one active antenna array element is set. The programmatic cancellation via a single offsetting antenna array element is somewhat independent of the other forms of leakage reduction described herein. One of the antenna array elements of the antenna array 210 is programmed to a magnitude level similar to the leakage level and phase which cancels leakage of the antenna array 210 as a whole. This is possible when the leakage of the antenna array 210 as a whole is lower than the maximum leakage of a single element. Programmatic cancellation may reduce the leakage of the antenna array 210 by between 10 and 20 dB.

At 945, a determination is made as to whether leakage is at a minimum. If not (945=No), the process returns to 935.

Otherwise (945=Yes), at 950 the array leakage magnitude and phase are measured.

At 955, the array residual leakage is measured. The array residual leakage is the leakage after the phase cancellation by row of antenna array elements and/or programmatic cancellation via a single offsetting antenna array element of the antenna array elements if either are invoked at 915 or 925 respectively.

At 960, a determination is made as to whether deembedding is required. The deembedding, if required, is a third form of leakage reduction, and involves systematic subtraction of the overall leakage from the antenna array when the antenna array elements are set to minimum power.

If deembedding is required (960=Yes), at 965 the array leakage is subtracted from the measured data. In the deembedding, before programming the antenna array 210 for phase sweep, the antenna array 210 is programmed for a minimum signal from 910 and the measured total leakage, magnitude and phase, are recorded, with all antenna array elements of the antenna array 210 set to the minimum level. This value is subtracted from all subsequent measurements, and improves the leakage response by approximately 20 decibels. The results of subtraction are recorded as a compensated magnitude and phase of the set of antenna array elements Thus the array leakage is on the order of −22 decibels lower than the maximum signal of a single radiator. This results reducing the magnitude error to approximately +−0.7 decibels and +−5 degrees. As shown in FIG. 9, deembedding may be performed uniformly as a third form of leakage reduction, even when the phase cancellation method of 920 is not performed and even when the programmatic cancellation via a single offsetting antenna array element of 930 to 945 is not performed.

When all three of the leakage reduction methods of FIG. 9 are applied in the order shown, the resulting error left may be approximately 0.1 decibels in amplitude and less than 1 degree error in phase.

At 999, the measurement of FIG. 9 is done. The measurement performed at 999 takes into account any of the leakage reductions performed in the method of FIG. 9. For implementation of phase calibration, for the measurement at 999, the registry list of desired antenna array elements is created, and the antenna array controller 250 cycles through gain and phase settings for each desired radiator antennal array element through, recording the result. The compensation array is created, and can be applied to the antenna array

210 to remove the effects of amplitude and phase deviation in the antenna array 210. FIG. 6 showed the results of calibration using the compensation array created using the teachings herein on a sample antenna array measurement, before and after array calibration.

In an embodiment, dedicated hardware implementations, such as application-specific integrated circuits (ASICs), field programmable gate arrays (FPGAs), programmable logic arrays and other hardware components, are constructed to implement one or more of the methods described herein. One or more embodiments described herein may implement functions using two or more specific interconnected hardware modules or devices with related control and data signals that can be communicated between and through the modules. Accordingly, the present disclosure encompasses software, firmware, and hardware implementations. Nothing in the present application should be interpreted as being implemented or implementable solely with software and not hardware such as a tangible non-transitory processor and/or memory.

In accordance with various embodiments of the present disclosure, the methods described herein may be implemented using a hardware computer system that executes software programs. Further, in an exemplary, non-limited embodiment, implementations can include distributed processing, component/object distributed processing, and parallel processing. Virtual computer system processing may implement one or more of the methods or functionalities as described herein, and a processor described herein may be used to support a virtual processing environment.

Accordingly, antenna array measurement and calibration enables calibration for antenna array elements of an antenna array one at a time using registry values obtained from a vector network analyzer which measures the antenna array. Leakage of the antenna array may be reduced by one or more mechanisms including row cancellation for adjacent rows of antenna array elements of the antenna array, programmatic cancellation via a single offsetting antenna array element, and/or deembedding by subtraction of total leakage measured when the antenna array is set to minimum signal. Alone or collectively, these mechanisms allow for accurate calibration of a phased array antenna on an element-by-element basis.

Although antenna array measurement and calibration has been described with reference to several exemplary embodiments, it is understood that the words that have been used are words of description and illustration, rather than words of limitation. Changes may be made within the purview of the appended claims, as presently stated and as amended, without departing from the scope and spirit of antenna array measurement and calibration in its aspects. Although antenna array measurement and calibration has been described with reference to particular means, materials and embodiments, antenna array measurement and calibration is not intended to be limited to the particulars disclosed; rather antenna array measurement and calibration extends to all functionally equivalent structures, methods, and uses such as are within the scope of the appended claims.

The illustrations of the embodiments described herein are intended to provide a general understanding of the structure of the various embodiments. The illustrations are not intended to serve as a complete description of all of the elements and features of the disclosure described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter. The preceding description of the disclosed embodiments is provided to enable any person skilled in the art to practice the concepts described in the present disclosure. As such, the above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents and shall not be restricted or limited by the foregoing detailed description.

The invention claimed is:

1. A system for measuring and calibrating an antenna array comprising a plurality of antenna array elements each configured to individually radiate signals, the system comprising:
    an antenna array controller comprising a memory that stores instructions and a processor that executes the instructions, wherein, when executed by the processor, the instructions cause the system to:
    obtain a list of registry values from a vector network analyzer;
    perform an iterative process including setting the antenna array based on a registry value from the list of registry values, wherein the process comprises programming a number of antenna array elements to a phase and an equivalent number to a 180 degree phase shift from the phase;

measure a magnitude and phase of each of a set of antenna array elements; and
compensate for leakage of antenna array elements of the set of antenna array elements.

2. The system of claim 1, comprising a plurality of antenna array elements each configured to individually radiate signals, wherein, when executed by the processor, the instructions further cause the system to:
    adjust all antenna array elements to a minimum amplitude;
    measure a leakage level of the antenna array in magnitude and phase to obtain a leakage measurement;
    for a set of antenna array elements turn on each set of antenna array elements one at a time;
    measure a magnitude and phase of the set of antenna array elements;
    vectorially subtract the leakage measurement of the magnitude and phase of the set of antenna array elements; and record a result as a compensated magnitude and phase of the set of antenna array elements.

3. The system of claim 1, wherein, when executed by the processor, the instructions cause the system further to:
    program a set of antenna array elements of the antenna array to a magnitude corresponding to a leakage level of the antenna array and a phase which cancels the leakage level of the antenna array.

4. The system of claim 3, wherein, when executed by the processor, the instructions cause the system further to:
    reiterate programming of the set of antenna array elements of the antenna array to meet a predetermined criterion.

5. The system of claim 1, wherein a set of antenna array elements is set to a phase and a matched set of antenna array elements are set to 180 degrees phase shift from the phase.

6. The system of claim 5, wherein when an antenna design has a 180 degrees phase shift between antenna array elements as a design attribute, phase register values are programmed to the same value.

7. The system of claim 5, wherein adjacent antenna array elements are programmed 180 degrees out of phase with each other.

8. The system of claim 5, wherein, when executed by the processor, the instructions cause the system further to:
    program a set of antenna array elements of the antenna array to a magnitude corresponding to a leakage level of the antenna array and a phase which cancels the leakage level of the antenna array.

9. The system of claim 8, wherein the instructions further cause the system to:
    adjust all antenna array elements to a minimum amplitude;
    measure a leakage level of the antenna array in magnitude and phase;
    for a set of antenna array elements turn on each set of antenna array elements one at a time;
    measure a magnitude and phase of the set of antenna array elements;
    vectorially subtract leakage measurement of the magnitude and phase of the set of antenna array elements; and record a result as a compensated magnitude and phase of the set of antenna array elements.

10. The system of claim 5, wherein the instructions further cause the system to:
    adjust all antenna array elements to a minimum amplitude;
    measure a leakage level of the antenna array in magnitude and phase;

for a set of antenna array elements turn on each set of antenna array elements one at a time;

measure a magnitude and phase of the set of antenna array elements;

vectorially subtract leakage measurement of the magnitude and phase of the set of antenna array elements;

and record a result as a compensated magnitude and phase of the set of antenna array elements.

11. A tangible, non-transitory computer readable medium comprising instructions, which when executed by a processor, cause the processor to:

obtain a list of registry values from a vector network analyzer;

perform an iterative process including setting an antenna array based on a registry value from the list of registry values, wherein the process comprises programming a number of antenna array elements to a phase and an equivalent number to a 180 degree phase shift from the phase;

measure a magnitude and phase of each of a set of antenna array elements; and compensate for leakage of antenna array elements of the set of antenna array elements.

12. The tangible, non-transitory computer readable medium of claim 11, wherein the instructions, when executed by the processor, further cause the processor to:

adjust all antenna array elements to a minimum amplitude;

measure a leakage level of the antenna array in magnitude and phase to obtain a leakage measurement;

for a set of antenna array elements turn on each set of antenna array elements one at a time;

measure a magnitude and phase of the set of antenna array elements;

vectorially subtract the leakage measurement of the magnitude and phase of the set of antenna array elements; and record a result as a compensated magnitude and phase of the set of antenna array elements.

13. The tangible, non-transitory computer readable medium of claim 11, wherein the instructions, when executed by a processor, further cause the processor to:

program a set of antenna array elements of the antenna array to a magnitude corresponding to a leakage level of the antenna array and a phase which cancels the leakage level of the antenna array.

14. The tangible, non-transitory computer readable medium of claim 13, wherein the instructions, when executed by a processor, further cause the processor to:

reiterate programming of the set of antenna array elements of the antenna array to meet a predetermined criterion.

15. The tangible, non-transitory computer readable medium of claim 13, wherein the instructions, when executed by a processor, further cause the processor to program adjacent antenna array elements 180 degrees out of phase with each other.

16. The tangible, non-transitory computer readable medium of claim 11, wherein a set of antenna array elements is set to a phase and a matched set of antenna array elements are set to 180 degrees phase shift from the phase.

17. The tangible, non-transitory computer readable medium of claim 16, wherein when an antenna design has a 180 degrees phase shift between antenna array elements as a design attribute, the instructions further cause the processor to program phase register values to the same value.

18. The tangible, non-transitory computer readable medium of claim 16, wherein the instructions, when executed by a processor, further cause the processor to:

program a set of antenna array elements of the antenna array to a magnitude corresponding to a leakage level of the antenna array and a phase which cancels the leakage level of the antenna array.

19. The tangible, non-transitory computer readable medium of claim 18, wherein the instructions, when executed by a processor, further cause the processor to:

adjust all antenna array elements to a minimum amplitude;

measure a leakage level of the antenna array in magnitude and phase;

for a set of antenna array elements turn on each set of antenna array elements one at a time;

measure a magnitude and phase of the set of antenna array elements;

vectorially subtract leakage measurement of the magnitude and phase of the set of antenna array elements;

and record a result as a compensated magnitude and phase of the set of antenna array elements.

20. The tangible, non-transitory computer readable medium of claim 16, wherein the instructions, when executed by a processor, further cause the processor to:

adjust all antenna array elements to a minimum amplitude;

measure a leakage level of the antenna array in magnitude and phase;

for a set of antenna array elements turn on each set of antenna array elements one at a time;

measure a magnitude and phase of the set of antenna array elements;

vectorially subtract leakage measurement of the magnitude and phase of the set of antenna array elements;

and record a result as a compensated magnitude and phase of the set of antenna array elements.

* * * * *